United States Patent [19]

Hensler et al.

[11] Patent Number: 5,232,620

[45] Date of Patent: Aug. 3, 1993

[54] SODIUM TRIPOLYPHOSPHATE COMPOSITION AND METHOD OF PRODUCING IT

[75] Inventors: Paul L. Hensler; Ronald E. Arnold, both of Lawrence, Kans.; Hilary A. Himpler, Charlotte, N.C.

[73] Assignee: FMC Corporation, Philadelphia, Pa.

[21] Appl. No.: 662,055

[22] Filed: Feb. 28, 1991

[51] Int. Cl.⁵ .................... C11D 3/06; C11D 9/14; C11D 11/00
[52] U.S. Cl. .................... 252/135; 252/156; 252/174.21; 252/174.12; 423/315
[58] Field of Search .................... 423/315, 208, 179; 252/135, 174.21, 174.14, 156

[56] References Cited

U.S. PATENT DOCUMENTS

| | | | |
|---|---|---|---|
| 3,030,180 | 4/1962 | Bigot | 423/315 |
| 3,356,447 | 12/1967 | Tafler | 423/315 |
| 3,361,675 | 1/1968 | Fuchs | 423/315 |
| 3,383,321 | 5/1968 | Davis et al. | 252/135 |
| 3,446,580 | 5/1969 | Fuchs | 23/106 |
| 3,469,938 | 9/1969 | McLeod et al. | 23/107 |
| 3,637,339 | 1/1972 | Gray | 252/99 |
| 3,672,826 | 6/1972 | Hornig et al. | 23/106 |
| 3,751,222 | 8/1973 | Gobert | 8/111 |
| 3,770,644 | 11/1973 | Huttinger et al. | 252/135 |
| 3,852,212 | 12/1974 | Groening et al. | 252/135 |
| 3,993,734 | 11/1976 | Verdier et al. | 423/315 |
| 4,251,498 | 2/1981 | Hensler et al. | 423/315 |
| 4,255,274 | 3/1981 | Hensler et al. | 252/135 |
| 4,276,326 | 6/1981 | Joshi | 427/220 |
| 4,315,898 | 2/1982 | Lutz | 423/315 |
| 4,362,641 | 12/1982 | Peterson | 252/135 |
| 4,427,417 | 1/1984 | Porasik | 252/135 |
| 4,656,019 | 4/1987 | Hensler | 423/315 |
| 4,671,948 | 6/1987 | Couffin et al. | 423/315 |
| 4,770,865 | 9/1988 | Highfill | 423/315 |
| 4,853,144 | 8/1989 | Highfill | 252/135 |
| 4,857,287 | 8/1989 | Dick et al. | 423/315 |

OTHER PUBLICATIONS

Phosphorus and It's Compounds, vol. I, John R. Van Wazer, 1958, pp. 645, 648-650.

*Primary Examiner*—Paul Lieberman
*Assistant Examiner*—Erin M. Higgins
*Attorney, Agent, or Firm*—Frank Ianno; Robert L. Andersen

[57] ABSTRACT

A granular STPP suitable for detergent compositions which is non-caking in non-agitated water is produced by wetting anhydrous phase II STPP granules and drying the granules to remove free water. The resulting granules, when incorporated in detergent compositions, form a free flowing detergent slurry in detergent dispensing systems.

10 Claims, No Drawings

SODIUM TRIPOLYPHOSPHATE COMPOSITION AND METHOD OF PRODUCING IT

This invention relates to sodium tripolyphosphate. More particularly, the invention pertains to a form of sodium tripolyphosphate employed in detergent compositions exhibiting improved resistance to caking when added to water.

Sodium tripolyphosphate (STPP) is an important industrial chemical which has a variety of uses and applications. It is, for instance, a key component in the manufacture of detergents and in food processing.

STPP is conventionally obtained by the calcination of sodium orthophosphate salts. A typical commercial procedure involves reacting phosphoric acid and an alkali sodium compound, such as soda ash, to first produce an aqueous sodium orthophosphate mixture having an Na:P molar ratio of 5:3 commonly referred to as "ortho liquor". This is then dried and the resulting solid orthophosphate mixture heated (calcined) at sufficient temperatures to form anhydrous STPP.

The drying and heating of the ortho liquor can be carried out sequentially in a rotary dryer or in a one-step operation by means of spray drying. STPP prepared in a rotary dryer consists of bulky masses which are crushed and screened to yield a granular material. Spray drying provides granular STPP directly.

STPP derived from the calcination of orthophosphates is of two types designated as phase I and phase II, depending on the calcination temperature, phase I predominantly at higher temperatures, phase II at lower temperatures. Generally speaking, the ratio of the phases can be controlled by calcining at temperatures ranging from about 450° C. for maximum phase II yields and at 600° C. for maximum phase I yields. A representative commercial STPP, having a phase I/phase II ratio of 25 to 75, can be manufactured in a rotary dryer at calcination temperatures of about 515° C. to 530° C.

As is well known in the detergent art, a characteristic property of anhydrous STPP is its tendency to undergo caking when added to water in the absence of stirring or agitation. Caking is particularly pronounced with single phase material which yields a hard cake. Commercial 25/75 blend may or may not form a hard cake, being somewhat unpredictable in this respect, but any caking tendency which reduces its surface area and hence, its dissolving ease is unacceptable.

The caking behavior of STPP has proved troublesome in connection with some of the newly developed detergent systems which meter heavy duty detergent into large industrial and institutional dishwashers and automatic laundering devices. These systems are designed to protect workers and personnel from coming in contact with highly alkaline cleaning compositions.

In operating these systems, a charge of detergent is automatically delivered to the washing zone of the washing machine from a reservoir in the detergent dispenser. It is at this point that the STPP caking problem arises. On contact with water, a STPP containing detergent placed in the detergent dispenser is likely to be transformed into a monolithic lump or a viscous, sticky mass, depending on the phase type or phase ratio. In any event, the diminished surface area of the coalesced detergent reduces its rate of dissolution with consequent reduction in cleaning action.

It is known that the caking tendency of conventional STPP, having both phase I and phase II in substantial amounts, can be ameliorated by subjecting it to a moisturizing treatment. In this procedure, granules of 25/75 phase I/phase II STPP are contacted with water in such a manner that 1% to 2% water is evenly distributed on the granules. A typical moisturizing technique consists in spraying the STPP granules with water while maintaining them in a state of agitation.

Although the treatment aforesaid results in a non-caking STPP, it is still unsuited for the newly developed industrial detergent delivery systems. When charged into the detergent dispenser of an automatic dishwashing or laundering machines, the treated STPP forms a sticky globular mass which functions little or no better than the hard caking or untreated STPP.

A form of granular STPP which is non-caking and free flowing when added to water without agitation has now been discovered for use in preparing detergent formulations, wherein said STPP is moisturized granules of essentially phase II STPP which yields a non-caking, free flowing detergent formulation when the formulation is added to water in the absence of agitation, said STPP being produced by:

a) producing granules of anhydrous essentially phase II STPP by heating of sodium orthophosphate salts, b) contacting the STPP granules with a quantity of water, the upper limit being below the point at which the wetted granules commence to coalesce and are no longer free flowing, the lower limit of water being that quantity which is sufficient to maintain the free flowing granular character of the STPP granules in aqueous media, c) drying the wetted STPP granules from b) at a sufficient temperature to expel unbound water but not the bound water, so that no more than 0.5% by weight of unbound water remains, and d) recovering the moisturized and dried, essentially phase II, granules from c).

The term "essentially phase II" as used above and hereinafter refers to phase II STPP, but which may contain very small amounts, not more than about 5% by weight, of phase I STPP which is difficult to avoid coproducing in manufacturing phase II STPP.

In a generally preferred method for realizing the herein moisturized phase II granules, phase II STPP starting material is produced by heating sodium orthophosphate salts, preferably "ortho liquor" in a rotary dryer at temperatures favoring phase II STPP formation, and crushing and sizing the rotary dryer product to give granules of anhydrous phase II STPP. Heating temperatures employed are typically from about 465° C. to about 475° C.. Size distribution of the anhydrous granules ranges about 100% -14 mesh, 15% -100 mesh; preferably about 95% -20 mesh, 10% -100 mesh.

The granulated phase II STPP is then moisturized by contacting the anhydrous granules of phase II STPP with water. A conventional moisturizing technique consists in spraying water on a rolling bed of the anhydrous granules contained in a rotary tube hydrator.

The quantity of water applied to the anhydrous phase II STPP granules can vary considerably, the upper limit being below the point at which the granules commence to coalesce and are no longer free flowing. Absorption of as much as about 10% by weight of bound water is acceptable. Part of the moisture taken up by the anhydrous granules is bound up in the hydrate form and a portion is in the free or unbound form. In general, the total water applied to the granules preferably runs about 5% to about 8% by weight.

The lower limit of water in the moisturized granules is that quantity of water, as determined by the still water caking test described hereinafter, which is sufficient to maintain the free flowing granular character of the granules when the granules are added to a volume of water in the absence of agitation or stirring. This condition is met when the finished level of bound water reaches about 3% by weight. Amounts of from about 5% to about 7% by weight bound water in the moisturized granules are preferred.

Removal of unbound water from the moisturized STPP granules is effected by heating them at sufficient temperatures. In general, heating at temperatures of about 60° C. to 80° C. serves to drive off essentially all of the unbound water without an appreciable effect on the bound water. Heating is conveniently effected in a rotating tube dryer in which lift flights lift and pour the moistened granules through a countercurrent flowing stream of hot air. The unbound water in the dried granules is not above about 0.5% by weight, typically 0.3% to 0.5% by weight water.

After recovery from the dryer, the granules are screened to give a size distribution of about 100% -14 mesh, 3% -100 mesh.

The moisturized phase II STPP granules produced in accordance with the invention remain in a granular state when added to non-agitated water, in a still water caking test described below. There is no sign of caking behavior, the granules forming a highly flowable, sand-like slurry.

The still water caking testing is performed by adding a sample of the moisturized granular STPP or detergent composition containing same into water in a ratio of 10 grams of STPP or detergent composition (as appropriate) to 20 milliliters of quiescent water with only enough movement of the sample with a stirring rod to wet the sample. After 5, 10 and 15 minutes probe the material to determine if it has set up into a hard cake. If the material has not set up allow it to stand for up to one hour, stir with a stirring rod and rapidly pour the mixture onto a flat surface with an edge drain and observe if the solids are in discrete form and readily flowable in the slurry.

The detergent formulation in which the present moisturized phase II granules are preferably employed are those designed for automatic delivery of a charge of the detergent, to a dishwasher or laundering machine from a reservoir in a detergent dispenser, without requiring handling or contact by personnel. These are typically high in alkalinity to facilitate better cleaning performance. A typical detergent formulation has the following ingredients:

a) sodium tripolyphosphate in amounts of about 10% to about 50% by weight,
b) alkalinity-imparting ingredients in amounts of about 10% to about 60% by weight,
c) surface-active ingredients in amounts of about 0% to about 20% by weight, and
d) oxidizing, soil and stain removing ingredients in amounts of about 0% to about 12% by weight.

The above detergent formulation can be designed for use in either automatic dishwashers or laundering machines employed in industrial and/or institutional applications. The sodium tripolyphosphate employed in such a formulation is the herein moisturized granules of essentially phase II STPP containing from 3% to 10% by weight (preferably 5% to 7% by weight) bound moisture and no more than 0.5% by weight (preferably 0.3% to 0.5% by weight) of unbound moisture. The bound moisture and the use of essentially phase II STPP are necessary to yield a STPP which remains as discrete particulates, forming a flowable sandy slurry in the still water caking test; and when used in detergent formulations the STPP yields a readily flowable, non-caking detergent when it is placed in quiescent water. Also, the low amount of unbound water in this product is helpful in not degrading other components of the detergent formulation admixed with the STPP which may be sensitive to moisture, particularly the oxidizing, soil and stain removing ingredients such as chlorine-releasing agents, for example, sodium dichloroisocyanuric acid, sodium perborates, sodium carbonate peroxide (also called sodium percarbonate), optical brighteners and enzymes.

The amount of the STPP employed in the formulation depends on the hardness and temperature of the water employed, the degree of soiling of the articles to be cleaned and the type of soils to be removed. Typical formulations contain from about 10% to about 50% by weight STPP, with heavy duty cleaning formulations employing the upper portion, that is, about 25% to 50% by weight, of the range.

The second component, the alkalinity-imparting ingredients, is employed in amounts of about 10% to about 60% by weight. The most common of these ingredients employed are the alkali metal salts or alkali metal hydroxides which are basic in aqueous solution. The most common and preferred are sodium hydroxide, sodium carbonate and sodium silicates, including sodium metasilicate and sodium orthosilicate. Also useful are alkali metal salts such as potassium carbonate, potassium bicarbonate, potassium silicates, sodium bicarbonate, sodium sesquicarbonate, potassium sesquicarbonate and alkali metal hydroxides such as potassium hydroxide. These may be used individually or in admixture with one another. For example, it is common to use sodium silicate in addition to sodium carbonate or sodium hydroxide because the sodium silicate, in addition to imparting alkalinity to the formulation, also gives corrosion protection to equipment and enhances cleaning as well.

The institutional dishwashing formulations tend to have higher alkalinity than those employed in laundering and employ the more alkaline ingredients, for example, sodium hydroxide and sodium silicate, and higher amounts of such alkalinity-imparting ingredients, within the range set forth above, than do formulations intended for laundering clothes. The less alkaline laundering formulations employ less alkaline ingredients in the lower portion of said range, alone, or in admixture with smaller amounts of the more alkaline ingredients to achieve the required overall alkalinity.

The third component, or surface-active ingredient, is employed both for its surfactant cleaning properties as well as to control the degree of foaming. The preferred ingredient is a nonionic surface-active agent which is a non-soap synthetic detergent made up by condensation of alkylene oxide groups (to form hydrophilic polyoxyalkylene groups) with an organic hydrophobic compound. Among the hydrophobic compounds which can be used are polyoxypropylene, the reaction product of propylene oxide and ethylene diamine, aliphatic alcohols, alkylphenols, etc.

Examples of nonionic synthetic detergents useful in the present invention are, condensation products of 6 to 30 moles, and preferably 7 to 11 moles, of ethylene oxide with 1 mole of an alkylphenol containing 6 to 12 carbon atoms in the alkyl group; condensation products of 6 to 30 moles of ethylene oxide with 1 mole of an aliphatic straight or branch chained alcohol containing 8 to 18 carbon atoms; condensation products of ethylene oxide and the reaction product of propylene oxide and ethylene diamine; nonyl phenol polyethoxy ethanol (commerically known as "Triton N" series); isooctyl phenol polyethoxy ethanol (commercially known as "Triton X" series). Another well known group of nonionic detergents is marketed as "Pluronic" series. These compounds are the reaction products obtained by condensing ethylene oxide with a hydrophobic base produced by the condensation of propylene oxide with propylene glycol. The addition of polyoxyethylene radicals to the hydrophobic based increases the water solubility of the nonionic detergent and concurrently increases the foaming properties of the detergent in aqueous solution in proportion to the mole ratio of polyoxyethylene radicals to the hydrophobic base.

When making up dishwashing formulations, the preferred nonionic surface-active ingredient is a surfactant such as Triton ® CF-54, Triton ® DF-12, Pluronic ® LF 61 or Pluronic ® LF 62 because it reduces foaming during the washing cycle. It is employed in small amounts of 0% to about 2% by weight. Triton ® CF-54 is an octylphenoxypolyethoxyethyl butyl ether, while Triton ® DF-12 is a similar modified polyethyoxylated alcohol. Pluronic ® LF 61 and Pluronic ® LF 62 are both block copolymers formed by condensing ethylene oxide with a hydrophobic base formed by the condensation of propylene oxide with propylene glycol, wherein the hydrophobic base has a molecular weight of about 1500 to 1800. Often such surfactants can be omitted from the dishwashing formulation because they are added directly during the rinse cycle to improve rinsing action.

When the formulations are intended for washing machines to launder clothing, the nonionic surface-active agent can be employed in amounts of from 0 to 20 weight percent. When employed, the preferred nonionic surface-active agents include alcohol alkoxylates, for example, alkylphenol alkoxylates, and preferably alcohol ethoxylates or alcohol propoxylates. However, the alcohol structure may vary considerably in chain length. For example, surface-active agents such as Neodol ® 91-2.5 is the reaction product of a $C_9$–$C_{11}$ alcohol with an average of 2.5 moles of a ethylene oxide to form a polyethoxylate. Other similar nonionic surface-active agents which can be used in laundering machine formulations include the following:

| Surface-Active Agent | Structure |
| --- | --- |
| Neodol ® 23-6.5 | $C_{12}$–$C_{13}$ alcohol ethoxylate (1 mole $C_{12}$–$C_{13}$ alcohol to 6.5 moles ethylene oxide) |
| Neodol ® 91-6 | $C_9$–$C_{11}$ alcohol ethoxylate (1 mole $C_9$–$C_{11}$ alcohol to 6 moles ethylene oxide) |
| Triton ® X-100 | octylphenyl ethoxylate (1 mole of octylphenol to 10 moles of ethylene oxide) |
| Neodol ® 25-7 | $C_{12}$–$C_{15}$ alcohol ethoxylate (1 mole $C_{12}$–$C_{15}$ alcohol to 7 moles ethylene oxide) |
| Neodol ® 25-9 | $C_{12}$–$C_{15}$ alcohol ethoxylate (1 mole $C_{12}$–$C_{15}$ alcohol to 9 moles ethylene oxide) |
| Neodol ® 45-13 | $C_{14}$–$C_{15}$ alcohol ethoxylate (1 mole of $C_{14}$–$C_{15}$ alcohol to 13 moles ethylene oxide) |
| Neodol ® 45-7 | $C_{14}$–$C_{15}$ alcohol ethoxylate (1 mole of $C_{14}$–$C_{15}$ alcohol to 7 moles of ethylene oxide) |

In situations where foam control is not a problem, the surface-active agents can be an anionic surface-active agent, alone or in combination with other surface-active agents, either nonionic or anionic. The preferred anionic surface-active agent employed in laundering machine formulations is sodium dodecylbenzene sulfonate (Sulframin ® 85).

Other water-soluble anionic sulfonate or sulfate surface-active agents useful in the present composition include alkali metals salts of: alkyl sulfonates, such as $C_{10}$–$C_{20}$ alkyl sodium sulfonate; alkylaryl sulfonates, such as $C_{10}$–$C_{16}$ alkyl benzene sodium sulfonate; alkene sulfonates, such as the $C_{10}$–$C_{20}$ alkene sodium sulfonate; alkyl sulfates, such as $C_8$–$C_{20}$ alkyl sodium sulfates, preferably sodium lauryl sulfate; alkylaryl sulfates, such as $C_{10}$–$C_{16}$ alkyl benzene sodium sulfate; alkene sulfates, such as $C_{10}$–$C_{20}$ alkene sodium sulfate. In laundering machine formulations, the $C_{10}$–$C_{14}$ alkyl benzene sodium sulfonates are the preferred class of anionic surface-active agents useful in this invention.

If desired, additional surface-active agents may also be employed. They include such additional surfaceactive agents as are compatible with said nonionic surface-active agents, described previously, and anionic sulfonate or sulfate agents, above described. An additional surface-active agent is sodium ethoxylated alcohol sulfate, such as Neodol ® 25-3S, which is the reaction product of 1 mole of a $C_{12}$–$C_{15}$ alcohol with 3 moles of ethoxylate, and which is sulfated and recovered as its sodium salt.

The fourth component, that is, the oxidizing, soil and stain removing ingredients, is employed when additional cleaning ingredients are necessary to achieve a higher degree of cleaning than is possible with the other three ingredients, mentioned above. The ingredients include chlorine-releasing agents, such as trichloroisocyanuric acid, dichloroisocyanuric acid and alkali metal salts thereof, such as sodium dichloroisocyanurate and hydrates thereof. Other compatible chlorine-releasing agents, such as solid hypochlorites, for example, calcium hypochlorite, may also be employed.

Other such ingredients, typically used in laundry formulations, include the hydrogen peroxide-derived compounds such as alkali metal perborates, for example, sodium perborate and hydrates thereof, alkali metal carbonate peroxide (also called alkali metal percarbonates), for example, sodium carbonate peroxide, which may be used alone or with activators such as tetraacetyl diamine (TAED); and enzymes for better detergency. Optical brighteners are often added to laundry formulations to add a desirable whiteness to the article being laundered.

When required in the formulation to enhance cleaning any of these oxidizing, soil and stain removing ingredients, or mixtures thereof, are employed in total amounts of 0% to about 12% by weight in the formulation. In addition to the above ingredients, the formulation may also contain other well-known ingredients normally used such as coloring agents, perfumes, foam depressants, corrosion control additives and other such conventional ingredients.

Reference is now made to the following non-limiting examples.

EXAMPLE 1

Following the above described procedure, a specimen of granular, essentially phase II STPP was produced by calcining ortho liquor in a rotary dryer at 465° C. to 475° C., and screened to yield a product having a mesh size of 100% -14 mesh. The granules were treated with water to give a total water content of about 7% to 8% by weight of the total composition. The treated granules were dried at between 60° C. and 80° C. to remove free water. The resulting moisturized granular phase II STPP had a bound water concentration of 6%. It was screened to yield a sized material of 100% -14 mesh, 3% -100 mesh. Its unbound water content was 0.5% by weight.

The product formed a free flowing, sandy slurry of STPP granules in the still water caking test.

EXAMPLE 2

In this Example carried out as in Example 1, the moisturized phase II STPP granular starting material contained 7% by weight water and the back dried product contained 6% by weight bound water. The residual unbound water was a 0.5% by weight. The STPP granules formed discrete particles of a sandy slurry when subjected to the still water caking test.

EXAMPLES 3-7

These Examples using the above described procedure were carried out to determine the minimal quantity of moisture content in the finally processed phase II STPP granules to prevent caking and maintain the granularity of the granules in non-agitated water. The Examples correspond to final moisture concentration by weight of 0%, 1%, 3%, 5% and 7%, respectively. When the samples were submitted to the still water caking test, it was observed that, at 0% treatment, the phase II formed a hard, rocky lump; at 1%, a cake was formed but it was not as hard as that produced at 0% water. At the 3% level, caking tendency was decreasing and the STPP was beginning to exhibit the property of retaining its granularity. At the 5% and 7% levels, the STPP formed a readily flowable slurry of individual granules.

EXAMPLE 8

A detergent formulation high in alkalinity was formulated, typical of those employed in institutional dish washing detergents, having the following components, by weight:

| | |
|---|---|
| a) sodium tripolyphosphate (produced as set forth in Example 1 and containing essentially phase II with 6% by weight bound water and 0.5% by weight unbound water) | 35% |
| b) sodium hydroxide | 58% |
| c) sodium carbonate | 4.8% |
| d) nonionic surface-active agent (Triton ® CF-54) | 0.6% |
| e) sodium silicate | 1.5% |

The formulation was subjected to the still water caking test and found not to cake after 5 minutes of standing in quiescent water and at 5 minute intervals thereafter as required in the test procedure. After standing in quiescent water for not quite one hour, the mixture on being stirred and poured on a flat surface was found to be free flowing with slight granulation of ingredients.

We claim:

1. In the process of preparing detergent formulations containing sodium tripolyphosphate, the improvement that consists essentially of employing as said sodium tripolyphosphate ingredient moisturized granules of essentially phase II sodium tripolyphosphate, containing no more than about 5% by weight of phase II sodium tripolyphosphate, which yields a non-caking, free flowing detergent formulation when added to water in the absence of agitation, and wherein said added sodium tripolyphosphate is produced by:
   a) forming granules of anhydrous, essentially phase II sodium tripolyphosphate by heating of sodium orthophosphate salts,
   b) contacting the sodium tripolyphosphate granules with a quantity of water, the upper limit being below the point at which the wetted granules commence to coalesce and are no longer free flowing, the lower limit of water being that quantity which is sufficient to maintain the free flowing granular character of the STPP granules in aqueous media,
   c) drying the wetted sodium tripolyphosphate granules from b) at a sufficient temperature to expel unbound water but not the bound water, so that no more than 0.5% by weight of unbound water is present, and
   d) recovering the moisturized and dried, essentially phase II granules from c) containing no more than about 5% by weight of phase I sodium tripolyphosphate.

2. The process of claim 1 wherein the amount of bound water in the recovered, moisturized, essentially phase II sodium tripolyphosphate is from about 5% to about 7% by weight.

3. The process of claim 1 wherein the STPP granules in step a) are about 100% -14 mesh, and about 15% -100 mesh and in step d) about 100% -14 mesh, and about 3% -100 mesh.

4. The process of claim 1 wherein the granules are dried from about 60° to 80° C.

5. The process of claim 5 wherein the drying is carried out in a rotating tube dryer.

6. The process of claim 1 wherein the essentially phase II STPP granules contain no more than 5% by weight of phase I STPP.

7. In the process of preparing detergent formulations containing:
   a) sodium tripolyphosphate in amounts of about 10% to about 50% by weight,
   b) alkalinity-imparting ingredients in amounts of about 10% to about 60% by weight,
   c) surface-active ingredients in amounts of about 0% to about 20% by weight,
   d) oxidizing, soil and stain removing ingredients in amounts of about 0% to about 12% by weight, the improvement that consists essentially of employing as the ingredient in a) above, a sodium tripolyphosphate (STPP) comprising moisturized granules of essentially phase II STPP containing no more than about 5% by weight of phase I sodium tripolyphosphate which yields a non-caking, free flowing detergent formulation when added to water in the absence of agitation, said STPP produced by:

e) forming granules of anhydrous, essentially phase II STPP by heating of sodium orthophosphate salts, f) contacting the STPP granules with a quantity of water, the upper limit being below the point at which the wetted granules commence to coalesce and are no longer free flowing, the lower limit of water being that quantity which is sufficient to maintain the free flowing granular character of the STPP granules in aqueous media, g) drying the wetted STPP granules from f) at a sufficient temperature to expel unbound water but not the bound water, so that no more than 0.5% of unbound water is present, and h) recovering the moisturized and dried, essentially phase II granules from g) containing no more than about 5% by weight of phase I sodium tripolyphosphate.

8. Process of claim 7 wherein the component b) is selected from the group consisting of sodium carbonate, sodium hydroxide and sodium silicate and mixtures thereof.

9. Process of claim 7 wherein the component c) is a nonionic surface-active agent.

10. In the process of preparing detergent formulations containing:

a) sodium tripolyphosphate in amounts of about 10% to about 50% by weight, b) alkalinity-imparting ingredients in amounts of about 10% to about 60% by weight, c) surface-active ingredients in amounts of about 0% to about 20% by weight, d) oxidizing, soil and stain removing ingredients in amounts of about 0% to about 12% by weight, the improvement that consists essentially of employing as the ingredient in a) above, a sodium tripolyphosphate (STPP) comprising moisturized granules of essentially phase II STPP containing no more than about 5% by weight of phase I sodium tripolyphosphate which yields a non-caking, free flowing detergent formulation when added to water in the absence of agitation, said STPP produced by:

e) forming granules of anhydrous, essentially phase II STPP by heating of sodium orthophosphate salts, f) contacting the STPP granules with water so that the STPP granules contain bound water in amounts of from about 3% to about 10% by weight, g) drying the wetted STPP granules from f) at a temperature of about 60° C. to about 80° C. to expel unbound water but not the bound water, so that no more than 0.5% of unbound water is present, and h) recovering the moisturized and dried, essentially phase II granules from g) containing no more than about 5% by weight of phase I sodium tripolyphosphate.

* * * * *

UNITED STATES PATENT AND TRADEMARK OFFICE
CERTIFICATE OF CORRECTION

PATENT NO. : 5,232,620
DATED : August 3, 1993
INVENTOR(S) : Paul L. Hensler, Ronald E. Arnold, Hilary A. Himpler It is certified that error appears in the above-identified patent and that said Letters Patent is hereby corrected as shown below:

Column 5, line 51, "a" should read --an--.
Column 6, line 33, "surfaceac-" should read --surface-ac- --.
Column 8, line 14, "II" should read --I--; line 20, "tripolyphosphate by" should read --tripolyphosphate (STPP) by--; lines 22-28, "b) contacting the sodium tripolyphosphate granules with a quantity of water, the upper limit being below the point at which the wetted granules commence to coalesce and are no longer free flowing, the lower limit of water being that quantity which is sufficient to maintain the free flowing granular character of the STPP granules in aqueous media," should read --b) contacting the STPP granules with water so that the STPP granules contain bound water in amounts of from about 3% to about 10% by weight,--; line 47, "60°" should read --60°C--. Column 9, lines 5-11, "f) contacting the STPP granules with a quantity of water, the upper limit being below the point at which the wetted granules commence to coalesce and are no longer free flowing, the lower limit of water being that quantity which is sufficient to maintain the free flowing granular character of the STPP granules in aqueous media," should read --f) contacting the STPP with water so that the STPP granules contain bound water in amounts of from about 3% to about 10% by weight,--.

Signed and Sealed this

Twenty-ninth Day of March, 1994

Attest:

BRUCE LEHMAN

Attesting Officer       Commissioner of Patents and Trademarks